United States Patent
Zhang et al.

(10) Patent No.: US 8,477,689 B2
(45) Date of Patent: Jul. 2, 2013

(54) SYSTEM AND METHODS FOR DISTRIBUTED MEDIUM ACCESS CONTROL AND QOS SCHEDULING IN MOBILE AD-HOC NETWORKS

(75) Inventors: Qinqing Zhang, Clarksville, MD (US); Lotfi Benmohamed, Clarksville, MD (US); Bharat T. Doshi, Ellicott City, MD (US)

(73) Assignee: The John Hopkins University, Baltimore, MD (US)

( * ) Notice: Subject to any disclaimer, the term of this patent is extended or adjusted under 35 U.S.C. 154(b) by 569 days.

(21) Appl. No.: 12/732,271

(22) Filed: Mar. 26, 2010

(65) Prior Publication Data

US 2010/0246549 A1 Sep. 30, 2010

Related U.S. Application Data

(60) Provisional application No. 61/163,569, filed on Mar. 26, 2009.

(51) Int. Cl.
*H04L 12/56* (2006.01)

(52) U.S. Cl.
USPC .......................... 370/328; 370/338; 370/445

(58) Field of Classification Search
USPC ................................................. 370/328–338
See application file for complete search history.

(56) References Cited

U.S. PATENT DOCUMENTS

| | | | |
|---|---|---|---|
| 6,766,309 B1 | 7/2004 | Cheng et al. | |
| 6,901,593 B2 | 5/2005 | Aweya et al. | |
| 7,075,980 B2 | 7/2006 | Liang et al. | |
| 7,257,083 B2 | 8/2007 | Bansal et al. | |
| 7,266,085 B2 | 9/2007 | Stine | |
| 7,408,911 B2 | 8/2008 | Joshi | |
| 7,643,509 B2 | 1/2010 | Han | |
| 2002/0102987 A1 | 8/2002 | Souisse et al. | |
| 2003/0198200 A1 | 10/2003 | Diener et al. | |
| 2005/0058151 A1* | 3/2005 | Yeh | 370/445 |
| 2006/0198346 A1* | 9/2006 | Liu et al. | 370/338 |
| 2007/0076742 A1 | 4/2007 | Du et al. | |
| 2007/0153737 A1 | 7/2007 | Singh et al. | |
| 2007/0195812 A1 | 8/2007 | Lee et al. | |
| 2007/0286097 A1 | 12/2007 | Davies | |

(Continued)

OTHER PUBLICATIONS

Maheshwari, R. ; Multichannel MAC Protocols for Wireless Networks; 28-29, Sep. 2006; IEEE- Sensor and Ad Hoc Communications and Networks, 2006. SECON '06. 2006 3rd Annual IEEE Communications Society; vol. 2; pp. 393-401.*

(Continued)

*Primary Examiner* — Hassan Phillips
*Assistant Examiner* — Omeed D Rahgozar
(74) *Attorney, Agent, or Firm* — Noah J. Hayward

(57) ABSTRACT

A communication device includes a transmitter portion, a receiver portion and a management portion. The transmitter portion transmits information into a channel. The receiver portion receives information from the channel. The management portion includes a request-to-send packet generating portion, a clear-to-send packet receiving portion, a threshold database, a comparator and a resolution packet generating portion. The threshold database stores a threshold value for the parameter of the channel and provides the threshold value to the comparator. The comparator compares the threshold value and the channel parameter information and generates an instruction signal based on the comparison. The resolution packet generating portion generates a resolution packet based on the instruction signal and provides the resolution packet to the transmitter portion.

16 Claims, 6 Drawing Sheets

U.S. PATENT DOCUMENTS

| | | | |
|---|---|---|---|
| 2007/0297371 A1* | 12/2007 | Lea | 370/334 |
| 2008/0013497 A1* | 1/2008 | Belcea | 370/337 |
| 2009/0103501 A1 | 4/2009 | Farrag et al. | |
| 2009/0116430 A1 | 5/2009 | Banta et al. | |
| 2009/0213815 A1 | 8/2009 | Sherman et al. | |

OTHER PUBLICATIONS

NPL—Multichannel MAC Protocols for Wireless Networks; 26-28; Sep. 2006.*

* cited by examiner

SYSTEM AND METHODS FOR DISTRIBUTED MEDIUM ACCESS CONTROL AND QOS SCHEDULING IN MOBILE AD-HOC NETWORKS

CROSS-REFERENCE TO RELATED APPLICATION

The present application claims priority from U.S. Provisional Application No. 61/163,569 filed Mar. 26, 2009, the entire disclosure of which is incorporated herein by reference.

BACKGROUND

A mobile ad-hoc network (MANET) is an autonomous system that includes communication devices connected by wireless links. The communication devices are free to move randomly and organize themselves arbitrarily. Thus the network topology and connectivity may change rapidly and unpredictably. Unlike a network with infrastructure support, each communication device in a MANET acts as a router, forwarding data packets to other communication devices. A communication device communicates with one or multiple communication devices within the coverage of the signal transmitted over the wireless link. If a pair of source and destination communication devices is not in each other's communication range, data packets will be forwarded to the destination by the relaying communication devices located between the source and destination. A general architecture of MANET is shown in FIG. 1.

FIG. 1 illustrates a conventional MANET 100.

MANET 100 includes a communication device 102, 104, 106, 108, 110 and 112.

In this example, each communication device 102, 104, 106, 108, 110 and 112 is able to communicate with every other communication device located on MANET 100. Communication channels provide the ability to communicate bi-directionally between the communication devices. Communication device 102 may communicate bi-directionally with communication device 104 via a communication channel 122, with communication device 106 via a communication channel 118, with communication device 108 via a communication channel 114, with communication device 110 via a communication channel 116 and with communication device 112 via a communication channel 120. Communication device 104 may communicate with communication device 106 via a communication channel 124, with communication device 108 via a communication channel 126, with communication device 110 via a communication channel 128 and with communication device 112 via a communication channel 130. Communication device 106 may communicate bi-directionally with communication device 108 via a communication channel 132, with communication device 110 via a communication channel 134 and with communication device 112 via a communication channel 136. Communication device 108 may communicate bi-directionally with communication device 110 via a communication channel 140 and with communication device 112 via a communication channel 138. Communication device 110 may communicate bi-directionally with communication device 112 via a communication channel 142.

Although, each of communication channels 114, 116, 118, 120, 122, 124, 126, 128, 130, 132, 134, 136, 138, 140 and 142 are illustrated as distinct communication channels, they all share a predetermined frequency band within the wireless medium, as will be described in more detail. Communication channels are examples of communications media. Communications media typically embody computer-readable instructions, data structures, program modules, or other data in a modulated data signal such as a carrier wave or other transport mechanism and include any information-delivery media. Non-limiting examples of communications media include wired media, such as wired networks and direct-wired connections, and wireless media such as acoustic, radio, infrared, and other wireless media. The term "computer-readable media" as used herein includes both storage media and communications media.

The wireless medium is shared by all the communication devices in MANET 100. Collision will occur if multiple communication devices attempt to transmit at the same time. Therefore, each communication device usually employs a carrier sense medium access (CSMA) mechanism to avoid collision. In a general CSMA scheme, a communication device first senses the channel to determine if the channel is idle. If the channel is idle, the communication device will contend for the channel for packet transmission. This will now be described in more detail.

In wireless LAN standards, for example, such as 802.11, a medium access control (MAC) layer specifies a collision avoidance and carrier sense medium access (CA-CSMA) method. One optional feature is to use the RTS/CTS (Request to Send/Clear to Send) handshaking that provides positive control over the use of the shared medium. For purposes of discussion, take an example where communication device 102 is to communicate with communication device 108. When communication device 102 has a packet to send to communication device 108, communication device 102 first senses the channel to determine if the channel is idle. If the channel is idle, communication device 102 sends a RTS packet to communication device 108. Communication device 108 receives the RTS packet and responds with a CTS packet. Communication device 102 must receive a CTS packet before sending the data packet. The CTS also contains a time value that alerts communication device 104, 106, 110 and 112 to hold off from accessing the medium while communication device 102 transmits its data. The primary reason for implementing RTS/CTS is to minimize collisions among hidden communication devices. This occurs when communication devices are spread out throughout the area and have a relatively large volume of data traffic in the wireless LAN.

Quality of Service (QoS) refers to the capability of providing service differentiation for different applications, users and/or data flows, to guarantee a certain level of performance. For example, a required transmission rate, delay and packet loss needs to be guaranteed to ensure the service quality. Voice application has a stringent delay requirement but does not require a high transmission rate. File transfer usually needs high transmission rate and no packet loss but can tolerate certain transmission delay. Streaming video application on the other hand requires both small delay and high transmission rate. QoS guarantees are very important when the network capacity is insufficient. Mechanisms need to be designed to ensure the QoS requirements while managing the limited resources in an optimal and efficient way. Since the wireless medium is always a limited resource and shared with many communication devices/users, efficient MAC and QoS scheduling mechanisms are necessary when supporting different applications and data flows.

The wireless medium is time varying and has dynamic characteristics from communication device to communication device. Different communication devices may experience very different channel quality depending on the locations. Each communication device itself may experience varying channel quality over time as well. For example, although communication device 102, 104 and 108 may share the same wireless medium and therefore frequency band, a communication device may perceive a very different characteristic of communication channel 114 as compared to communication channel 122.

The channel quality is a channel characteristic that affects the effective transmission data rate. In general, when the channel quality is good, a communication device can transmit at a higher data rate. When the channel quality is bad, a communication device can only transmit at a low data rate and/or have large packet loss. The medium may be more efficiently used if each communication device can probe the channel quality and select the best time to transmit its data. When a communication device is not sending data, other communication devices can be selected to transmit when the channel quality is good. The variation of channel quality in time and user domains can be exploited to gain significant improvement in transmission efficiency. This is sometimes called time diversity gain and user diversity gain.

Conventional MAC mechanism lacks any coordination among the communication devices, especially in an ad-hoc network environment. For example, communication device 102 may contend for the wireless medium whenever it has a packet to send. Communication device 102 will utilize the wireless medium when other communication devices are not transmitting. Communication device 102 does not take consideration of the time varying characteristics of the wireless medium and multiple users, and thus cannot fully explore the time diversity and user diversity gain. There is also no existing MAC scheduling algorithm to support the QoS requirement for different applications. When communication device 102 has packets for multiple data flows, it selects a packet to send based on first-come first-serve discipline. QoS cannot be guaranteed in this mechanism.

What is needed is a system and method for efficient MAC and scheduling methods in a distributed manner to optimize a MANET throughput and performance.

BRIEF SUMMARY

The present invention provides a system and methods for efficient MAC and scheduling methods in a distributed manner to optimize a MANET throughput and performance.

In accordance with an aspect of the present invention, a communication device and methods are provided for communicating with a receiving device over a channel within a mobile ad-hoc network. The receiving device includes a clear-to-send (CTS) packet generating portion that can generate and a CTS packet based on a parameter of the channel and that can transmit the CTS packet over the channel. The communication device includes a transmitter portion, a receiver portion and a management portion. The transmitter portion can transmit information into the channel. The receiver portion can receive information from the channel. The management portion includes a request-to-send (RTS) packet generating portion, a CTS packet receiving portion, a threshold database, a comparator and a resolution (RES) packet generating portion. The management portion is in communication with the transmitter portion and the receiver portion. The RTS packet generating portion can generate a RTS packet and can provide the RTS packet to the transmitter portion. The transmitter portion can transmit the RTS packet to the receiving device by way of the channel. The receiver portion can receive the CTS packet from the receiving device by way of the channel and can provide the CTS packet to the CTS packet receiving portion. The threshold database can store a threshold value for the parameter of the channel and can provide the threshold value to the comparator. The CTS packet receiving portion can provide channel parameter information, to the comparator, based on the CTS packet. The comparator can compare the threshold value and the channel parameter information and can generate an instruction signal based on the comparison. The transmitter portion can transmit information into the channel based on the instruction signal.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Figure 1:
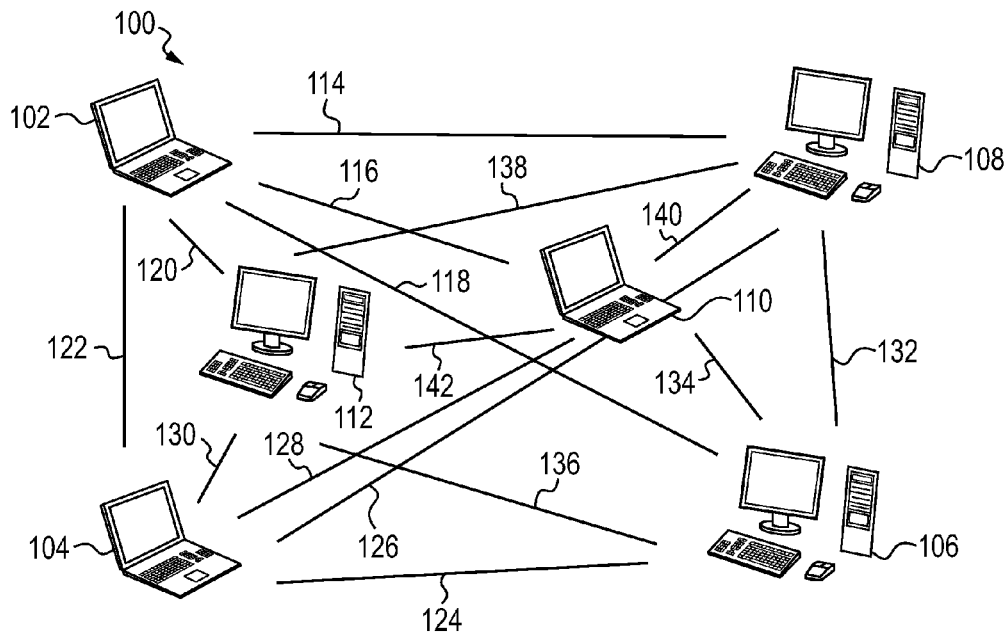
FIG. 1 illustrates an example conventional MANET.

In accordance with aspects of the present invention, a system and method are provided for medium access control and data flow scheduling implemented at each communication device within a MANET.

In a first example aspect of the present invention, a distributed threshold based medium access control is used to obtain multi-dimensional diversity gain.

An adaptive threshold based contention scheme exploits both the time and user diversity gain in the shared wireless medium. When a transmitting communication device has data to send, if it senses that the channel is idle, it sends a RTS packet to the receiving communication device for channel reservation. Upon receipt of a CTS packet with the transmission rate indication from the receiving communication device, the transmitting communication device compares the rate with a threshold. If the indicated rate is larger than the threshold, the communication device sends the data packet. Otherwise, the communication device aborts the data transmission and waits for the next contention after a back off time period.

This aspect of the present invention will be described using two non-limiting example methods of setting the threshold at each communication device.

The first example method uses a common threshold setting for all the communication devices in the network. The common threshold value is set to maximize the aggregate throughput of the network. In this method, only communication devices whose channel condition is above a rate threshold are allowed to send. Communication devices whose channel condition is worse than the threshold will not be able to transmit data. This method will give more transmission opportunities to users with better channel quality, while penalizing users with poor channel quality. As a result, it will achieve a higher network throughput. Obviously, the drawback of this method is that it does not provide any fairness among the users. Users who are in poor RF conditions will be prevented for transmission if the achievable transmission rate is below the threshold.

The second method uses a local threshold setting for each of the communication devices in the network. It sets the threshold to maximize the network throughput and also achieve fairness among the users. Since each communication device may transmit data to different neighboring communication devices, each communication device maintains its own threshold associated with each of its neighboring communication devices and adapts the value dynamically.

The first example aspect discussed above will be described in greater detail below with reference to FIGS. 2-6.

In a second example aspect of the present invention, a distributed medium-adaptive QoS scheduling system and method are provided to provide QoS differentiation while improving the network efficiency and performance. In this aspect, presume that each communication device has multiple flows to be sent to one or more destinations, wherein each flow represents a different type of application traffic. For example, returning to FIG. 1, communication device 102 may need to send VoIP and FTP traffic to communication device 108, whereas communication device 108 may need to send VoIP traffic to communication device 106, and FTP traffic to communication device 110. In accordance with this aspect of the present invention, a system and method is provided to schedule the transmission at each communication device to determine when to access the medium, and which packet associated with the flow will be sent out.

The second example aspect discussed above will be described in greater detail below with reference to FIGS. 2, 3A-3C and 7-9.

The above-discussed first example aspects of the present invention will now be described.

Figure 2:
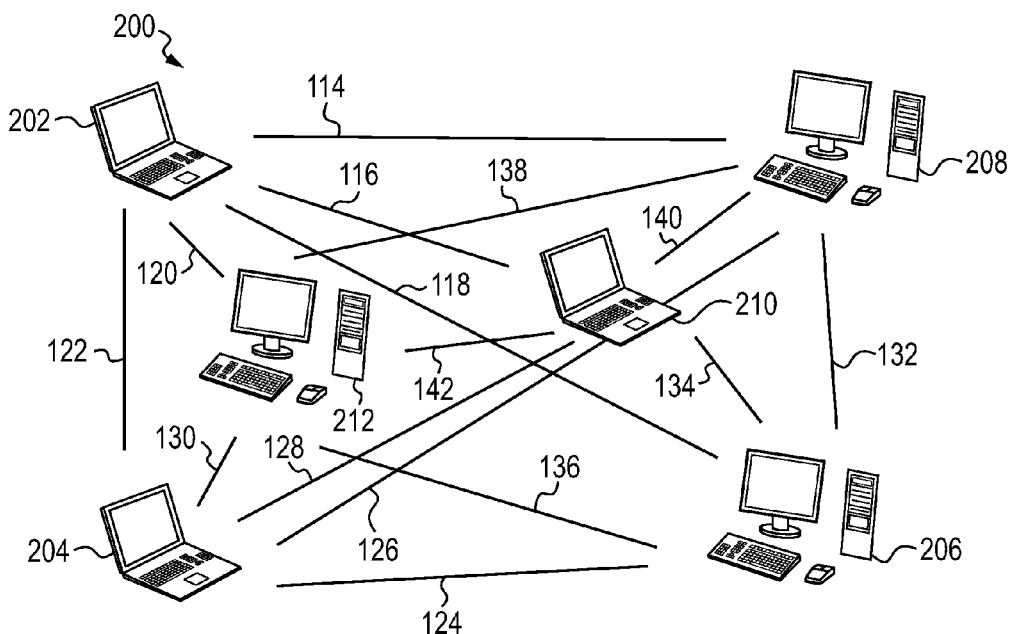
FIG. 2 illustrates an example MANET in accordance with aspects of the present invention.

FIG. 2 illustrates an example MANET 200 in accordance with aspects of the present invention.

MANET 200 is similar to MANET 100 discussed above with reference to FIG. 1. However, MANET 200 replaces communication devices 102, 104, 106, 108, 110 and 112 with communication devices 202, 204, 206, 208, 210 and 212, respectively.

In this example, each communication device 202, 204, 206, 208, 210 and 212 is able to communicate with every other communication located on MANET 200. Communication device 202 may communicate bi-directionally with communication device 204 via communication channel 122, with communication device 206 via communication channel 118, with communication device 208 via communication channel 114, with communication device 210 via communication channel 116 and with communication device 212 via communication channel 120. Communication device 204 may communicate with communication device 206 via communication channel 124, with communication device 208 via communication channel 126, with communication device 210 via communication channel 128 and with communication device 212 via communication channel 130. Communication device 206 may communicate bi-directionally with communication device 208 via communication channel 132, with communication device 210 via communication channel 134 and with communication device 212 via communication channel 136. Communication device 208 may communicate bi-directionally with communication device 210 via communication channel 140 and with communication device 212 via communication channel 138. Communication device 210 may communicate bi-directionally with communication device 212 via communication channel 142.

An example situation wherein communication device 202 communicates with communication device 208 will now be described in greater detail with reference to FIGS. 3A-6.

Figure 3A:
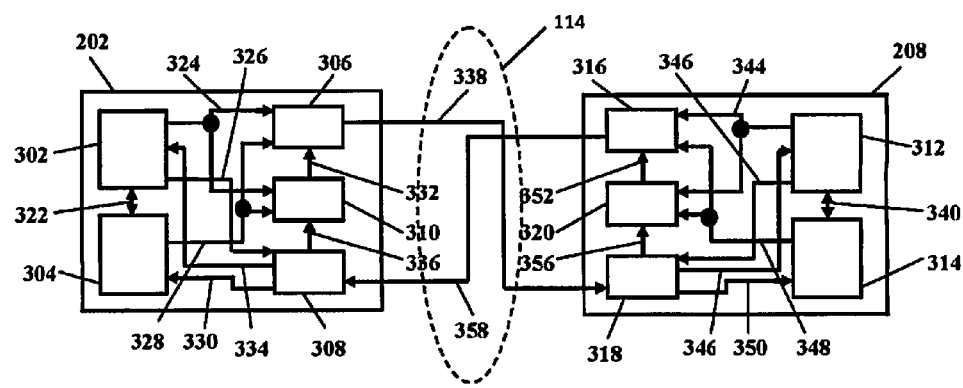
FIG. 3A illustrates example communication devices in accordance with aspects of the present invention.

FIG. 3A illustrates example communication devices 202 and 208 in accordance with aspects of the present invention.

Communication device 202 includes a processor portion 302, a memory portion 304, a transmitter portion 306, a receiver portion 308 and a management portion 310. Communication device 208 includes a processor portion 312, a memory portion 314, a transmitter portion 316, a receiver portion 318 and a management portion 320.

Each of the elements of communication device 202 are illustrated as individual devices, however, in some embodiments at least one of processor portion 302, memory portion 304, transmitter portion 306, receiver portion 308 and management portion 310 may be combined as a unitary device. Further, in some embodiments at least one of processor portion 302, memory portion 304, transmitter portion 306, receiver portion 308 and management portion 310 may be implemented as computer-readable media for carrying or having computer-executable instructions or data structures stored thereon. Such computer-readable media can be any available media that can be accessed by a general purpose or special purpose computer. Non-limiting examples of computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Processor portion 302 is arranged to communicate bi-directionally with memory 304 via a communication line 322. Processor portion 302 is arranged to provide information to transmitter portion 306 and management portion 310 via a communication line 324. Furthermore, processor portion 302 is arranged to provide information to receiver portion 308 via a communication line 326. Processor portion 302 is arranged to receive information from receiver portion 308 via a communication line 334. Any or all of communication line 322, communication line 324, communication line 326 and communication line 334 may be wired or wireless.

Memory portion 304, with instruction from processor portion 302, may provide information to transmitter portion 306 and management portion 310 via a communication line 328. Memory portion 304 is arranged to receive information from receiver portion 308 via a communication line 330. Any of communication line 328 and communication line 330 may be wired or wireless.

Management portion 310 is arranged to provide information to transmitter portion 306 via a communication line 332 and to receive information from receiver portion 308 via a communication line 336. Any of communication line 332 and communication line 336 may be wired or wireless.

Transmitter portion 306 of communication device 202 is operable to transmit information to receiver portion 318 of communication device 208 via a communication line 338. Transmitter portion 306 may be any known type of transmitter, wired or wireless.

Processor portion 312 is arranged to communicate bi-directionally with memory 314 via a communication line 340. Furthermore, processor portion 312 is arranged to provide information to transmitter portion 316 and to management portion 320 via a communication line 344. Processor portion 312 is arranged to receive information from receiver portion 318 via a communication line 346. Any or all of communication line 340, communication line 344 and communication line 346 may be wired or wireless.

Memory 314, with instruction from processor portion 312, may provide information to transmitter portion 316 and management portion 320 via a communication line 348. Memory 314 is arranged to receive information from receiver portion 318 via a communication line 350. Any or all of communication line 348 and communication line 350 may be wired or wireless.

Management portion 320 is arranged to provide information to transmitter portion 316 via a communication line 352 and to receive information from receiver portion 318 via a communication line 356. Any or all of communication line 352 and communication line 356 may be wired or wireless.

Transmitter portion 316 of communication device 208 is operable to transmit information to receiver portion 308 of communication device 202 via a communication line 358. Transmitter portion 316 may be any known type of transmitter, wired or wireless.

Communication line 338 and communication line 358 are represented as communication channel 114 in FIGS. 1-2.

Communicating from communication device 202 to communication device 208 will now be generally described with reference to FIG. 3B.

Figure 3B:
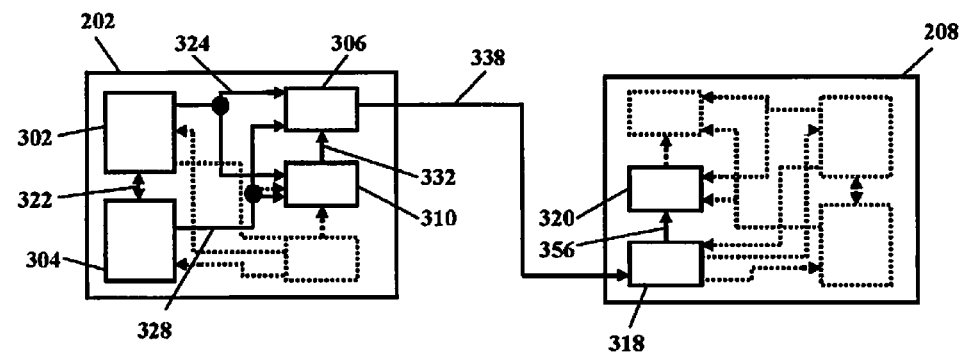
FIG. 3B illustrates the example communication devices of FIG. 3A in a transmit mode and receive mode, respectively.

FIG. 3B includes elements of FIG. 3A for transmitting information from communication device 202 to communication device 208. In FIG. 3B, items not used and signals not considered have been drawn with dotted lines to simplify the figure.

Information to be transmitted from communication device 202 to communication device 208 must originate from somewhere. For purposes of discussion, in this example, presume that the information to be transmitted will originate within one of processor portion 302 or memory portion 304. If the information originates from processor portion 302, the information to be transmitted will be provided to transmitter portion 306 via communication line 324. Alternatively, if the information originates from memory portion 304: 1) processor portion 302 may retrieve the information from memory portion 304 by way of communication line 322 and then provide the information to transmitter portion 306 and management portion 310 via communication line 324; or 2) processor portion 302 may instruct memory portion 304, by way of communication line 322, to provide the information to transmitter portion 306 and management portion 310 via communication line 328.

Before the information is transmitted from communication device 202 to communication device 208, a RTS/CTS handshake is performed between communication device 202 and communication device 208. This handshake starts with communication device 202 sending a RTS packet to communication device 208 to verify that communication channel 114 is free for transmission and thus reserve the channel.

Management portion 310 manages the RTS/CTS handshake by transmitter portion 306. The operation of management portion 310 will be described in greater detail later.

The RTS packet is transmitted from transmitter portion 306 to receiver portion 318 of communication device 208 via communication line 338. The RTS packet is received and processed by receiver portion 318 and is passed to management portion 320 by way of communication line 356. Management portion 320 then determines, based on the RTS packet, whether communication channel 114 is free for communication and whether the quality of communication channel 114 is sufficient for communication at a predetermined transmission rate.

Communicating from communication device 208 to communication device 202 will now be generally described with reference to FIG. 3C.

Figure 3C:
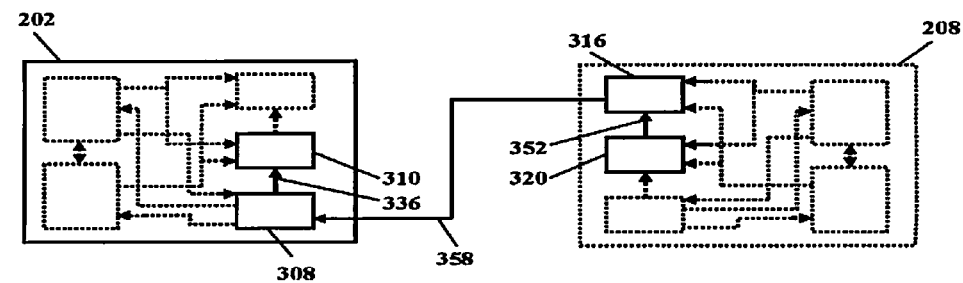
FIG. 3C illustrates the example communication devices of FIG. 3A in a receive mode and transmit mode, respectively.

FIG. 3C includes elements of FIG. 3A for transmitting information from communication device 208 to communication device 202 for receipt and processing by communication device 202. In FIG. 3C, items not used and signals not considered have been drawn with dotted lines to simplify the figure.

Management portion 320 manages the transmission of the information by transmitter portion 316. If management portion 320 has determined that communication channel 114 is free for communication and that the quality of communication channel 114 is sufficient for communication at a predetermined transmission rate, then management portion 320 will instruct transmitter portion 316, via communication line 352, to transmit a CTS packet back to communication device 202. The CTS packet includes the channel quality indication (such as the transmission rate) to instruct communication device 202 on what transmission rate it shall use. If management portion 320 has determined that communication channel 114 is either not free for communication either because the receiver portion 318 does not receive the RTS packet or because the received RTS packet has errors, then management portion 320 will not instruct transmitter portion 316 to transmit a CTS packet back to communication device 202. If transmitter portion 316 is to transmit a CTS packet back to communication device 202, the CTS packet will be transmitted through communication line 358.

If transmitter portion 316 transmits a CTS packet, at communication device 202, receiver portion 308 will receive the CTS packet. Receiver portion 308 will then provide the CTS packet to management portion 310 by way of communication line 336.

Returning to FIG. 3B, at this point, management portion 310 knows that communication channel 114 is clear and reserved for device 202 and 208. It also receives the channel quality indication (such as transmission rate) that it shall use. Therefore, management portion 310 instructs transmitter portion 306 to transmit the original information to be transmitted, which was provided for example from processor portion 302 or memory portion 304, using the indicated transmission rate.

Now, suppose for some reason, receiver portion 308 does not receive the CTS packet. This may be because: communication device 208 did not receive the RTS packet; communication device 208 received the RTS packet but management portion 320 determined that the quality of channel 114 was insufficient for communication; or communication device 208 sent the CTS packet, but for some reason, receiver portion 308 did not receive the CTS packet within a predetermined period of time. In this situation, management portion 310 will not instruct transmitter portion 306 to transmit the original information to be transmitted, which was provided for example from processor portion 302 or memory portion 304.

Once, communication is approved through the RTS/CTS handshake process as discussed above, the information to be transmitted is transmitted from transmitter portion 306 to receiver portion 318 of communication device 208 via communication line 338. The information is received and processed by receiver portion 318. Receiver portion 318 may transfer the information to processor portion 312 via communication line 346 or to memory 314 via communication line 350 if directed by processor portion 312.

A more detailed discussion of management portions 310 and 320 will now be described with reference to FIGS. 4 and 5.

Figure 4:
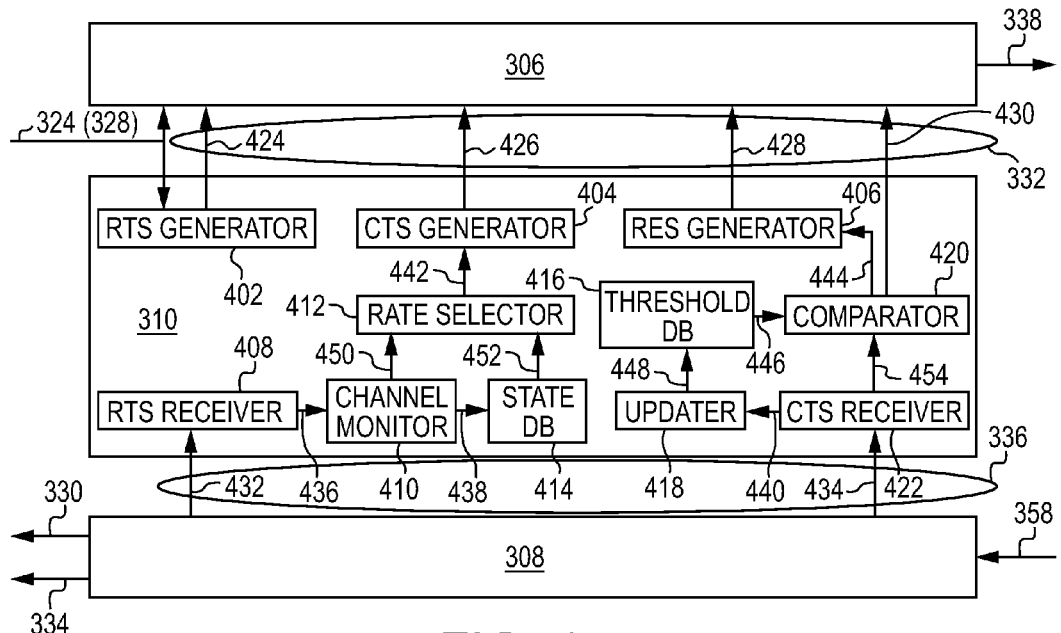
FIG. 4 illustrates an example management portion of a communication device in accordance with an aspect of the present invention.

FIG. 4 illustrates transmitter portion 306, receiver portion 308 and management portion 310 of FIG. 3A.

Management portion 310 includes a RTS generator 402, a CTS generator 404, a RES generator 406, a RTS receiver 408, a channel monitor 410, a rate selector 412, a state database 414, a threshold database 416, an updating portion 418, a comparator 420 and a CTS receiver portion 422.

Each of the elements of management portion 310 are illustrated as individual devices, however, in some embodiments at least one of RTS generator 402, CTS generator 404, RES generator 406, RTS receiver 408, channel monitor 410, rate selector 412, state database 414, threshold database 416, updating portion 418, comparator 420 and CTS receiver portion 422 may be combined as a unitary device. Further, in some embodiments at least one of RTS generator 402, CTS generator 404, RES generator 406, RTS receiver 408, channel monitor 410, rate selector 412, state database 414, threshold database 416, updating portion 418, comparator 420 and CTS receiver portion 422 may be implemented as computer-readable media for carrying or having computer-executable instructions or data structures stored thereon. Such computer-readable media can be any available media that can be accessed by a general purpose or special purpose computer. Non-limiting examples of computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

RTS Generator 402 is arranged to receive information from either communication line 324 or communication line 328. RTS generator 402 is arranged to provide information to transmitter portion 306 via a communication line 424. Communication line 424 may be wired or wireless.

CTS generator 404 is arranged to provide information to transmitter portion 306 via a communication line 426 and to receive information from rate selector 412 via a communication line 442. Rate selector 412 is arranged to receive information from state database 414 via a communication line 452 and from channel monitor 410 via a communication line 450. State database 414 is arranged to receive information from channel monitor 410 via a communication line 438. Channel monitor 410 is arranged to receive information from RTS receiver 408 via a communication line 436. RTS receiver 408 is arranged to receive information from receiver portion 308 via a communication line 432. Any or all of communication line 426, communication line 442, communication line 452, communication line 450, communication line 438, communication line 436 and communication line 432 may be wired or wireless.

RES generator 406 is arranged to provide information to transmitter portion 306 via a communication line 428 and to receive information from comparator 420 via a communication line 444. Comparator 420 is arranged to receive information from threshold database 416 via a communication line 446 and from CTS receiver portion 422 via a communication line 454. Comparator 420 is arranged to transmit information to transmitter portion 306 via a communication line 430. Threshold database 416 is arranged to receive information from updating portion 418 via a communication line 448. CTS receiver portion 422 is arranged to provide information to updating portion 418 via a communication line 440 and to receive information from receiver portion 308 via a communication line 434. Any or all of communication line 428, communication line 444, communication line 446, communication line 454, communication line 430, communication line 448, communication line 434 and communication line 440 may be wired or wireless.

Transmitter portion 306 is arranged to receive information via communication line 324 and communication line 328 and to transmit information via communication line 338. Receiver portion 308 is arranged to receive information via communication line 358 and to transmit information via communication line 330 and communication line 334.

Communication line 424, 426, 428 and 430 of FIG. 4 represent communication line 332 of FIGS. 3A-B. Communication line 432 and 434 represent communication line 336 in FIG. 3A and FIG. 3C.

RTS generator 402 is operable to generate and transmit a RTS packet via transmitter portion 306. CTS generator 404 is operable to generate and transmit a CTS packet via transmitter portion 306. RES generator 406 is operable to generate and transmit a RES packet via transmitter portion 306.

RTS receiver 408 is operable to receive and recognize a RTS packet. CTS receiver portion 422 is operable to receive and recognize a CTS packet.

Channel monitor 410 is operable to receive and process channel information using any known method for characterizing a channel. State database 414 is operable to store channel parameters and other information as processed and calculated by channel monitor 410. Rate selector 412 is operable to select the rate that information is to be conveyed via the communication network.

Updating portion 418 is operable to receive and process information for determining threshold parameters. Threshold database 416 is operable to store threshold parameters as processed by updating portion 418. Comparator 420 is operable to determine whether a data packet or a RES packet is to be transmitted by transmitter portion 306.

Figure 5:
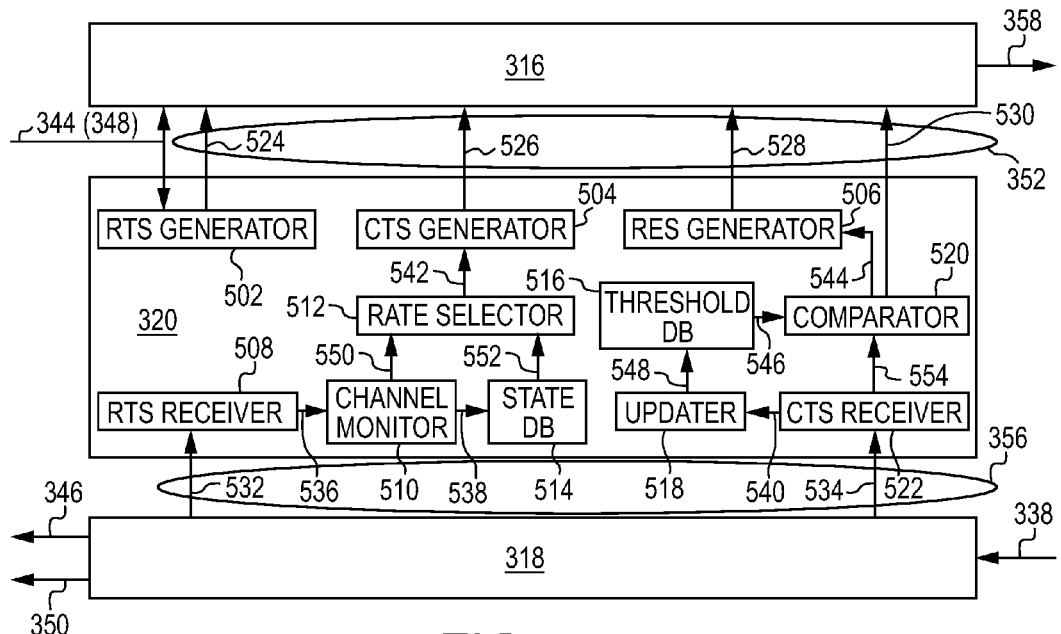
FIG. 5 illustrates another example management portion of another communication device in accordance with an aspect of the present invention.

FIG. 5 illustrates transmitter portion 316, receiver portion 318 and management portion 320 of FIG. 3A.

Management portion 320 includes a RTS generator 502, a CTS generator 504, a RES generator 506, a RTS receiver 508, a channel monitor 510, a rate selector 512, a state database 514, a threshold database 516, an updating portion 518, a comparator 520 and a CTS receiver 522.

Each of the elements of management portion 320 are illustrated as individual devices, however, in some embodiments at least one of RTS generator 502, CTS generator 504, RES generator 506, RTS receiver 508, channel monitor 510, rate selector 512, state database 514, threshold database 516, updating portion 518, comparator 520 and CTS receiver portion 522 may be combined as a unitary device. Further, in some embodiments at least one of RTS generator 502, CTS generator 504, RES generator 506, RTS receiver 508, channel monitor 510, rate selector 512, state database 514, threshold database 516, updating portion 518, comparator 520 and CTS receiver portion 522 may be implemented as computer-readable media for carrying or having computer-executable instructions or data structures stored thereon. Such computer-readable media can be any available media that can be accessed by a general purpose or special purpose computer. Non-limiting examples of computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

RTS Generator 502 is arranged to receive information from either communication line 344 or communication line 348. RTS generator 502 is arranged to provide information to transmitter portion 316 via a communication line 524. Communication line 524 may be wired or wireless.

CTS generator 504 is arranged to provide information to transmitter portion 316 via a communication line 526 and to receive information from rate selector 512 via a communication line 542. Rate selector 512 is arranged to receive information from state database 514 via a communication line 552 and from channel monitor 510 via a communication line 550. State database 514 is arranged to receive information from channel monitor 510 via a communication line 538. Channel monitor 510 is arranged to receive information from RTS receiver 508 via a communication line 536. RTS receiver 508 is arranged to receive information from receiver portion 318 via a communication line 532. Any or all of communication line 526, communication line 542, communication line 552, communication line 550, communication line 538, communication line 536 and communication line 532 may be wired or wireless.

RES generator 506 is arranged to provide information to transmitter portion 316 via a communication line 528 and to receive information from comparator 520 via a communication line 544. Comparator 520 is arranged to receive information from threshold database 516 via a communication line 546 and from CTS receiver 522 via a communication line 554. Comparator 520 is arranged to provide information to transmitter portion 316 via a communication line 530. Threshold database 516 is arranged to receive information from updating portion 518 via a communication line 548. CTS receiver 522 is arranged to provide information to updating portion 518 via a communication line 540 and to receive information from receiver portion 318 via a communication line 534. Any or all of communication line 528, communication line 544, communication line 546, communication line 554, communication line 530, communication line 548, communication line 540 and communication line 534 may be wired or wireless.

Transmitter portion 316 is arranged to receive information via communication line 344 and communication line 348 and to transmit information via communication line 358. Receiver portion 318 is arranged to receive information via communication line 338 and to transmit information via communication line 346 and communication line 350.

Communication lines 524, 526, 528 and 530 of FIG. 5 represent as communication line 352 of FIGS. 3A-B. Communication lines 532 and 534 represent communication line 356 in FIG. 3A and FIG. 3C.

RTS generator 502 is operable to generate and transmit a RTS packet via transmitter portion 316. CTS generator 504 is operable to generate and transmit a CTS packet via transmitter portion 316. RES generator 506 is operable to generate and transmit a RES packet via transmitter portion 316.

RTS receiver 508 is operable to receive and recognize a RTS packet. CTS receiver 522 is operable to receive and recognize a CTS packet.

Channel monitor 510 is operable to receive and process channel information using any known method for characterizing a channel. State database 514 is operable to store channel parameters and other information as processed and calculated by channel monitor 510. Rate selector 512 is operable to select the rate that information is to be conveyed via the communication network.

Updating portion 518 is operable to receive and process information for determining threshold parameters. Threshold database 516 is operable to store threshold parameters as processed by updating portion 518. Comparator 520 is operable to determine whether a data packet or a RES packet is to be transmitted by transmitter portion 316.

An example method of communication in accordance with an aspect of the present invention will now be described with reference to FIGS. 3-6.

Figure 6:
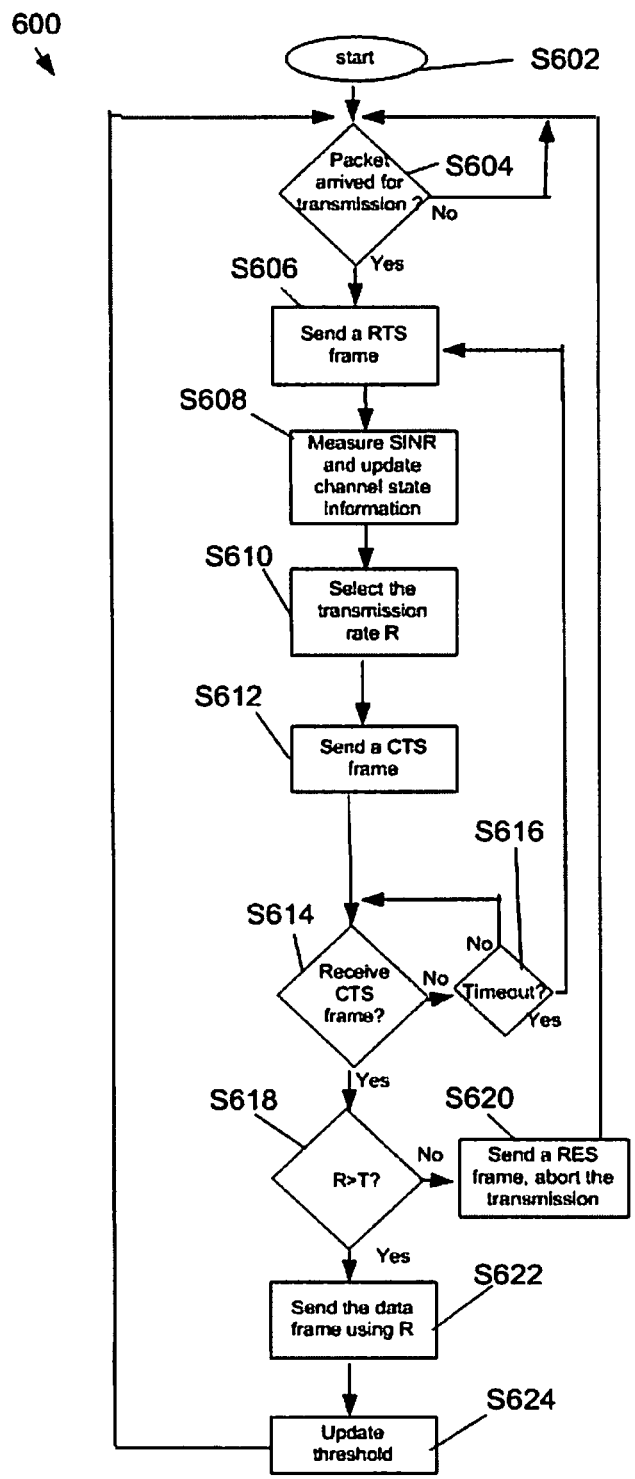
FIG. 6 is a flow chart describing an example communication method between two communication devices in accordance with an aspect of the present invention.

FIG. 6 is a flow chart describing an example communication method 600 between communication device 202 and communication device 208 in accordance with an aspect of the present invention.

Method 600 starts (S602), and information to be transmitted is received (S604). In an example embodiment, a communication packet is received by transmitter portion 306 and management portion 310. As discussed above, the communication packet may have originated from either processor portion 302, and arrived via communication line 324, or memory portion 304, and arrived via communication line 328.

Then an RTS packet is sent (S606) if the channel is idle. As discussed above, in an example embodiment, RTS generator 402 provides an RTS packet to transmitter portion 306 to transmit to receiver portion 318 of communication device 208 via communication line 338.

The RTS packet is received and the channel quality is measured (S608). As discussed above, in an example embodiment, the RTS packet is received by receiver portion 318 and is provided to RTS receiver 508 by way of communication line 532. RTS receiver 508 passes the RTS packet to channel monitor 510 by way of communication line 536. Channel monitor 510 may measure the quality of channel 114 by any known method, a non-limiting example of which includes measuring the signal to interference-plus-noise ratio (SINR). The state of communication channel 114 is then updated in state database 514 by way of communication line 438. By updating the state of communication channel 114, communication device 208 will be able to account for the constantly changing channel quality of communication channel 114. This is particularly important in a wireless setting.

A transmission rate is then selected (S610). In an example embodiment, channel quality is provided to rate selector 512 by channel monitor by way of communication line 450 and any other channel state information in state database 514 is additionally provided to rate selector 512 by way of communication line 452. Based on the channel quality and other channel state information, rate selector 512 then determines a communication rate at which communication device 202 should transmit information. For example, if the quality of communication channel 114 is relatively low, then the transmission rate will be relatively low. On the other hand, if the quality of communication channel 114 is relatively high, then the transmission rate will be relatively high.

A CTS packet is then sent (S612). In an example embodiment, rate selector 512 provides rate information to CTS generator 504 by way of communication line 542. CTS generator 504 then generates a CTS packet, which includes information regarding the prescribed transmission rate at which communication device 202 should transmit information. The CTS packet is provided to transmitter portion 316 by way of communication line 526. At this point transmitter portion 316 transmits the CTS packet, containing transmission rate information, to receiver portion 308 of communication device 202 via communication line 358.

It is then determined whether the CTS packet is received (S614). In an example embodiment, receiver portion 308 determines whether CTS packet has been received. If a CTS packet is not received within a predetermined period of time, CTS receiver portion 422 times out (S616). If a timeout occurs, CTS receiver portion 422 instructs, by way of communication line 454, comparator 420 to initiate a re-transmission of the RTS packet. In response, comparator 420 instructs, by way of communication line 430, transmitter portion 306 to re-transmit the RTS packet (S606). At this point, transmitter portion 306 re-transmits the RTS packet, which indicates to all communication devices within MANET 200 that will (or in fact, still intends to) transmit across communication channel 114.

Returning to step S614, if a CTS packet is received within a predetermined period of time, it is then determined whether the prescribed transmission rate is above a predetermined threshold (S618). In an example embodiment, threshold database 416 provides, by way of communication line 446, a predetermined threshold value to comparator 420. Further, as CTS receiver portion 422 provides, by way of communication line 454, the prescribed transmission rate provided in the CTS packet. Comparator 420 then compares the predetermined threshold value with the prescribed transmission rate provided in the CTS packet. As for the predetermined threshold value, two non-limiting example methods of predetermining will now be described.

A first example method of predetermining the threshold value includes using a common threshold setting for all communication devices within MANET 200. The common threshold value is set to maximize the aggregate throughput of MANET 200. In this method, only communication devices whose channel condition is above a rate threshold are allowed to transmit data. Communication devices whose channel condition is worse than the threshold will not be able to transmit data. For example, for purposes of discussion, presume the condition of communication channels 122 and 118 may be below the common threshold, whereas communication channels 120, 116 and 114 may be at or above the common threshold. In such a case, communication device 202 may be permitted to transmit information to any of communication devices 212, 210 and 208, but would not be permitted to transmit information to either of communication devices 204 and 206. Further, to continue the discussion, presume the condition of communication channels 124, 136, 118, 134 and 132 are all below the common threshold. In such a case, communication device 106 would not be permitted to transmit information to any of communication devices 202, 204, 212, 210 or 208.

This method of predetermining the threshold value will give more transmission opportunities to users with better channel quality, while penalizing users with poor channel quality. As a result, it will achieve a higher overall throughput for MANET 200. Clearly, the drawback of this method is that it does not provide any fairness among the users.

A second example method of predetermining the threshold value includes setting the threshold to maximize throughput of MANET 200 and also achieve fairness among the users. Since each communication device may transmit data to different neighboring communication devices, a communication device maintains its own threshold associated with each of its neighboring communication devices and adapts the value dynamically. For example, communication device 202 would maintain its own threshold associated with communication channels 122, 120, 118, 116 and 114 and would adapt its own threshold value dynamically. Similarly, communication device 204 would maintain its own threshold associated with communication channels 122, 130, 128, 126 and 124 and would adapt its own threshold value dynamically.

The threshold, for each respective communication device, represented by a transmission rate, is adjusted when receiving a rate indication from communication device j as $$T_{new}^j = \rho \cdot (\alpha R^j + (1-\alpha) T_{old}^j), \alpha, \rho \in [0,1], \quad (1)$$

where $T_{new}^j$ is the updated threshold to receiving communication device j; $T_{old}^j$ is the previous threshold value; $R^j$ is the transmission rate indication from receiving communication device j; $\alpha$ is a constant of the moving average of the threshold; $\rho$ is a loading coefficient, which is set dynamically based on the channel utilization estimation.

For simplicity, $\rho$ may be as an increasing function of the observed channel busy time percentage at the communication device, $$\rho = f\left(\frac{D_{busy}}{D_{observation}}\right) \quad (2)$$

where $D_{observation}$ is the observation time duration; $D_{busy}$ is the duration of the medium usage by other communication device during $D_{observation}$; and $f(\cdot)$ is a monotonically increasing function of the input variable. The coefficient $\rho$ increases as the channel busy time increases.

The motivation of using the loading coefficient $\rho$ in the threshold update in equation (1) is to make the threshold dynamically adapted to the loading. When the load is high with many communication devices and flows accessing the medium, the threshold is scaled to a higher value. A higher threshold will force the communication device to back off more often and release the medium for other communication devices to use. This will lead to an increased capacity of MANET 200 with more user diversity gain. On the other hand, when the load is low without many communication devices or flows utilizing the medium, the user diversity gain will be limited. A smaller threshold value will decrease the intentional back off and thus helps in reducing the underutilization of the channel and the packet delay.

In order to exploit the time variation of the medium, it is very important to develop a good channel estimation and prediction method. It is important because a transmitting device can then accurately track a channel, onto which the transmitting device plans to transmit. A non-limiting example channel probing method may include using both control and traffic packets to measure, estimate and predict a parameter of channel.

In MANET 200, since each of communication devices 202, 204, 206, 208, 210 and 212 may receive packets from all of its neighboring communication devices, respectively, each of communication devices 202, 204, 206, 208, 210 and 212 needs to maintain the channel state information from each neighbor and update its neighbor list periodically as topology of MANET 200 changes. This is discussed above with reference channel monitor 410 and state database 414 (S608). Of course in the example discussed above with reference to step S608, only a single state was monitored, i.e., the state of channel 114, because the discussion only dealt with communication device 202 communicating with communication device 208. However, in accordance with this aspect, state database 414 will update the state of each of communication channels 122, 120, 118, 116 and 114 upon receipt of a RTS packet from communication devices 204, 212, 206, 210 and 208, respectively.

A receiving communication device estimates the channel quality by measuring a parameter of the channel, a non-limiting example of such a measured parameter includes received SINR of the received packets from a sending communication device. The received signal strength of the RTS and CTS packet may be measured and maintained at each sender-receiver pair. For example, in the case where communication device 202 desires to send information to communication device 208 across channel 114: communication device 202 may update the state of channel 114 within threshold database 416 based on a received CTS packet from communication device 208, whereas communication device 208 may update the state of channel 114 within state database 514 based on a received RTS packet from communication device 202. On the other hand, in the case where communication device 208 desires to send information to communication device 202 across channel 114: communication device 208 may update the state of channel 114 within threshold database 516 based on a received CTS packet from communication device 202, whereas communication device 202 may update the state of channel 114 within state database 414 based on a received RTS packet from communication device 208.

Furthermore, when a data traffic packet may be received, its signal strength may be measured to be used in channel estimation and prediction. In other embodiments, a periodic packet can be exchanged between a sending communication device and a receiving communication device for channel estimation and prediction.

Returning now to step S618, if prescribed transmission rate, as determined based on the received CTS packet, is less than or equal to the predetermined threshold then an RES packet is sent (S620). In an example embodiment, if comparator 420 determines that the prescribed transmission rate is less than the predetermined threshold, comparator 420 instructs RES generator 406, by way of communication line 444, to generate an RES packet. RES generator 406 then provides an RES packet, by way of communication line 428, to transmitter portion 306. At this point, transmitter portion 306 transmits the RES packet, thus letting remaining communication devices 204, 206, 208, 210 and 212, know that communication device 202 will not be using channel 114. As such, remaining communication devices 204, 206, 208, 210 and 212 will know that the media is free for use. Communication device 202 then initiates transmission of the information again (S604).

Returning again to step S618, if prescribed transmission rate, as determined based on the received CTS packet, is greater than the predetermined threshold then the data is transmitted at the prescribed transmission rate (S622). In an example embodiment, if comparator 420 determines that the prescribed transmission rate is equal to or greater than the predetermined threshold, comparator 420 instructs transmitter portion 306, by way of communication line 430, to transmit the information at the prescribed transmission rate.

Then the predetermined threshold is updated, if needed (S624). For example, in situations where the predetermined threshold is static and is common for all communication devices within MANET 200, the predetermined threshold is not changed. However, in situations where each communication device within MANET 200 maintains its own predetermined threshold, based on communication channels with the other communication devices, updating portion 418 updates the predetermined threshold within threshold database 416 by way of communication line 448.

In example method 600 of FIG. 6, an adaptive threshold is provided based contention scheme to exploit both the time and user diversity gain in the shared wireless medium of MANET 200. When a transmitting communication device has data to send, it sends a RTS packet to the receiving communication device for channel reservation. Upon receipt of a CTS packet with the transmission rate indication from the receiving communication device, the transmitting communication device compares the rate with a predetermined threshold. If the indicated rate is larger than the predetermined threshold, the transmitting communication device sends the data packet. Otherwise, the transmitting communication device aborts the data transmission and waits for the next contention after a back off time period.

There are situations wherein communication device 202 may want to communicate with more than one communication device within MANET 200, or may want to send more than one type of data to a single communication device. In these types of situations, it would be beneficial to manage a multiple queue of communications within a communication device so as to maximize efficiency of MANET 200 as a whole. Another aspect of the present invention addresses these situations and will now be described in greater detail with reference to FIGS. 2, 3A-3C and 7-9.

In accordance with another aspect of the present invention, a system and method are provided for distributed medium-adaptive QoS scheduling that enables QoS differentiation while improving the network efficiency and performance. For purposes of discussion, presume that each communication device within MANET 200 has multiple flows to be sent to one or more destinations. Each flow represents a different type of application traffic. For example, communication device 208 may need to send VoIP and FTP traffic to communication device 208. Communication device 208 may need to send VoIP traffic to communication device 210, and FTP traffic to communication device 206. A MAC QoS scheduling method at each communication device within MANET 200 will determine when each communication device may respectively access the medium, and which packet associated with the flow will be sent out. This will now be described in greater detail.

Figure 7:
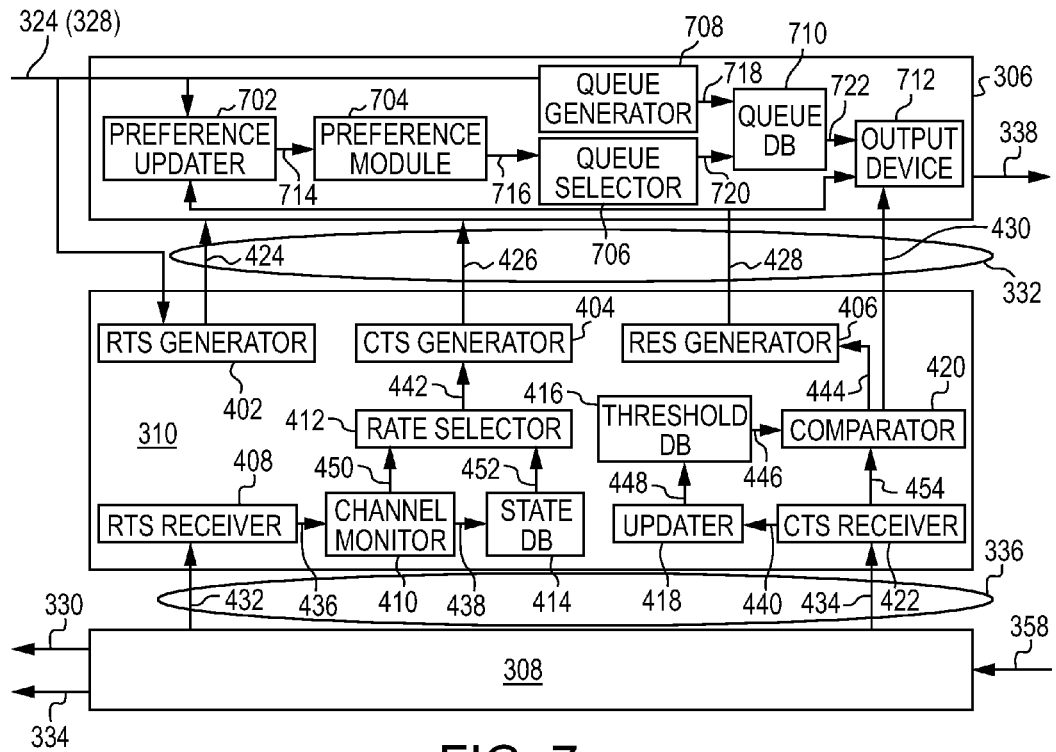
FIG. 7 illustrates another example management portion and an example transmitter portion of a communication device in accordance with an aspect of the present invention.

FIG. 7 illustrates transmitter portion 306, receiver portion 308 and management portion 310 of FIG. 3A.

FIG. 7 includes all of the elements of FIG. 4 with the further addition of elements included in transmitter portion 306. Transmitter portion 306 includes a preference updating portion 702, a preference module 704, a queue selector 706, a queue generator 708, a queue database 710 and an output device 712.

Each of the elements of transmitter portion 306 are illustrated as individual devices, however, in some embodiments at least one of preference updating portion 702, preference module 704, queue selector 706, queue generator 708, queue database 710 and output device 712 may be combined as a unitary device. Further, in some embodiments at least one of preference updating portion 702, preference module 704, queue selector 706, queue generator 708, queue database 710 and output device 712 may be implemented as computer-readable media for carrying or having computer-executable instructions or data structures stored thereon. Such computer-readable media can be any available media that can be accessed by a general purpose or special purpose computer. Non-limiting examples of computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Preference updating portion 702 is arranged to receive information by way of communication line 324 and communication line 328 and is arranged to receive information by way of communication line 428. Preference module 704 is arranged to receive information from preference updating portion 702 via a communication line 714. Queue selector 706 is arranged to receive information from preference module 704 via a communication line 716. Queue generator 708 is arranged to receive information by way of communication line 324 and communication line 328. Queue database 710 is arranged to receive information from queue generator 708 via a communication line 718 and is arranged to receive information from queue selector 706 via a communication line 720. Output device 712 is arranged to receive information from queue database 710 via a communication line 722 and is arranged to receive information from RES Generator 406 via communication line 428. Output device 712 is arranged to provide output information via communication line 338.

For purposes of discussion, presume that communication device 202 desires to send VoIP information to communication device 208, desires to send FTP information to communication device 210 and desires to send compressed A/V information to communication device 206. The VoIP information is made up of a set of VoIP packets, whereas the FTP information is made up of a set of FTP packets and whereas the compressed A/V information is made up of a set of A/V packets. To manage transmission of all of these different packets, they are grouped together as three different queues by queue generator 708. The three queues are stored in queue database 710. Queue selector 706 will select which packet within each set of information will be the next to be transmitted. The selected packet will be provided to output device 712 for transmission. Queue selector 706 selects a packet for transmission based on information from preference module 704. Preference module 704 maintains predetermined weighting factors for each set of packets within queue database 710. Preference updating portion 702 is able to modify the weighting factors within preference module 704.

Figure 8:
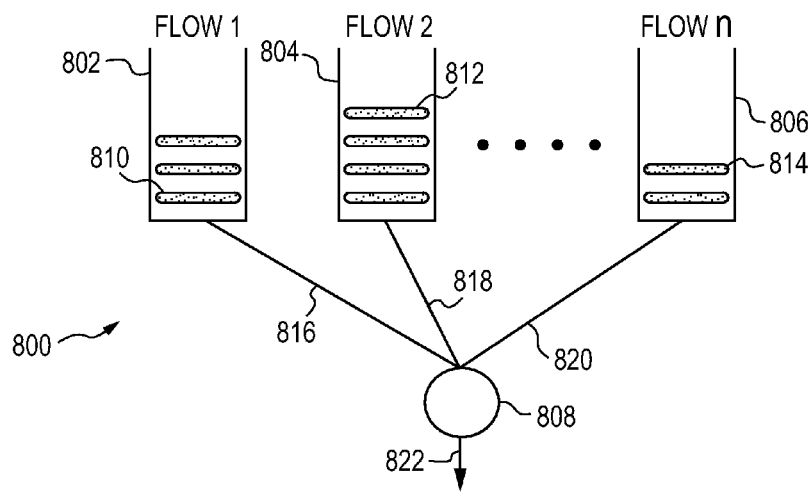
FIG. 8 illustrates an example of data management by the example management portion and an example transmitter portion of FIG. 7, in accordance with an aspect of the present invention.

FIG. 8 illustrates an example of data management by transmitter portion 306, receiver portion 308 and management portion 310 of FIG. 7, in accordance with an aspect of the present invention.

An adaptive scheduler queue 800 includes a plurality of information queues. Continuing with the most recently discussed example, adaptive scheduler queue 800 includes an information queue 802, an information queue 804 and an information queue 806. Furthermore, adaptive scheduler queue 800 includes a queue selector node 808.

Information queue 802 includes a set 810 of VoIP packets to be transmitted to communication device 208. Information queue 804 includes a set 812 corresponding to the set of FTP packets to be transmitted to communication device 210. Information queue 806 includes a set 814 of compressed A/V packets to be transmitted to communication device 206.

Queue selector node 808 may receive a data packet from information queue 802 via a communication path 816, from information queue 804 via a communication path 818 and from information queue 806 via a communication path 820. Queue selector node 808 transmits data external to FIG. 8 via a communication path 822.

An example method of communication in accordance with another aspect of the present invention will now be described with reference to FIGS. 7 and 8.

First, a set of traffic classes with weights $w_1, w_2, \ldots, w_n$ (n classes) are defined.

Each communication device within MANET 200 will maintain a set of information queues corresponding to its neighboring communication devices. For example, for each of communication devices 204, 206, 208, 210 and 212 to which communication device 202 intends to send information packets, communication device 202 will maintain a set of queues corresponding to such communication devices, respectively. Each information queue holds packets to be sent to the same neighboring communication device. For example, an information queue within communication device 202 that includes information packets to be sent to communication device 204 will not include any information packets that are to be sent to communication device 208. The packets in each information queue may include upper layer packets from different applications that are to be sent to different destinations, but they all have the same next hop neighbor address at the MAC layer. For example, an information packet with an information queue within communication device 202 may have an ultimate routed destination as communication device 206, e.g., it may be transmitted from communication device 202 to communication device 204 by way of communication channel 122; then from communication device 204 to communication device 210 by way of communication channel 128; and then finally from communication device 210 to communication device 206 by way of communication channel 134. In this situation, the information packet may be arranged in an information queue with other packets having a common first destination of communication device 204.

An arriving information packet to class i is assigned a virtual service time $V_{new}^j$, which is a function of its packet size and class weights, according to equation (3) as shown later. For example, a VoIP information packet arriving for transmission may have a different virtual service time $V_{new}^{VoIP}$ than the virtual service time $V_{new}^{FTP}$ corresponding to a FTP information packet that is arriving for transmission. Packets in each information queue are sorted according to their virtual service time $V_{new}^j$.

Each communication device maintains a queue drift D(k) and queue preference P(k) (where k is the index of the information queue), which is updated after each packet transmission. For example, referring to FIG. 8, communication device 204 will maintain a queue drift D(802) and queue preference P(802) for information queue 802, a queue drift D(804) and queue preference P(804) for information queue 804 and a queue drift D(806) and queue preference P(806) for information queue 806.

Each communication device maintains channel state information of each of its neighboring communication devices, as in method 600, discussed above with reference to FIG. 6. Further, each communication device maintains a rate threshold associated with each its neighboring communication devices, as in method 600.

When there are packets in the information queue waiting for transmission, the communication device selects the information queue with the highest preference. The preference is set as a combination of channel quality and queue drift level.

The communication device sends the probe message via RTS/CTS handshake for channel estimation and prediction, following the procedures in method 600, discussed above with reference to FIG. 6.

If the prescribed transmission rate, as indicated by the receiving device, is greater than the predetermined threshold, for example as discussed above with reference to step S618 of FIG. 6, then the information packet is transmitted, for example as discussed above with reference to step S622 of FIG. 6. However, if the prescribed transmission rate, as indicated by the receiving device, is not greater than the predetermined threshold, then (as compared with method 600 of FIG. 6), an RES packet is not automatically released.

In this example method, before the RES packet is released, it is determined whether the queue preference P(k) is greater than a predetermined critical preference $P(k)_{critical}$, i.e., $P(k) > P(k)_{critical}$. In particular, there may be situations where a receiving communication device tells a transmitting device the equivalent of "Hey, I just tested the channel between us and it isn't so good. So don't send anything at a rate at rate higher than X. Anything too high, and I'll risk not receiving enough of the message." There may be a situation where the transmitting device would receive such a message and think "I don't care what you (receiver) think. This message is important so I have to get it out at a specific rate. Therefore, I am just going to have to risk it and send it anyway." For example, for purposes of discussion, presume that communication device 202 intends to send set 810 of VoIP packets from information queue 802 to communication device 208. During the RTS/CTS handshake, communication device 208 instructs communication device 202 to transmit the information packets at a prescribed transmission rate. Now, presume that the prescribed transmission rate will be insufficient to transmit VoIP packet. In such a case, in line with method 600 discussed above, communication device 202 would have sent an RES packet, aborted the transmission attempt and started over. However, in line with another example method, communication device 202 may first decide to transmit the VoIP packet anyway, and risk that communication device 208 will receive it.

If it is eventually determined that the queue preference P(k) is not greater than the predetermined critical preference $P(k)_{critical}$, i.e., $P(k) \leq P(k)_{critical}$, then an RES packet is released, for example as discussed above with reference to step S620 of FIG. 6. Then the queue drift is updated and queue preference is recalculated. These are updated and recalculated to take into account the fact that the queue in question has just released a packet. Thus the other queues have been waiting so send a packet a little bit longer.

When a packet of size L of class j arrives, the virtual service time for class j, $V_{new}^j$, is calculated as $$V_{new}^j = V_{old}^j + L/w_j \qquad (3),$$

$V_{new}^j$ is reset when class j becomes active after being idle for more than some time T. For example, returning to FIG. 8, suppose a large information VoIP packet arrives into information queue 802, the virtual service time for that class, i.e., VoIP data, will change.

The queue drift calculation is based on tracking the transmission opportunity for each information queue to account for missed or gained opportunity to access the shared medium. The queue drift is updated as follows. First, the queue drift for queue k is initialized, D(k)=0, for all k in [1,K], where K is the number of information queues. Then, at each packet transmission, if information queue i is being served, the drifts are updated as D(i)=D(i)−$L_i$, where $L_i$ is the packet length of packet being served from information queue i; D(k)=D(k)+$L_k$, for all k∈[1,K], k≠i, where $L_k$ is the length of the packet in the head of information queue k. Finally, D(k) is reset to 0 when link k becomes active after being idle for more than some time period T. Here D(k)>0 means that information queue k has missed transmission opportunities. D(k)<0 means that information queue k is ahead of schedule.

In example embodiments, the queue preference P(k) is a function of channel state and the queue drift D(k). In example embodiments, the channel state can be captured by the threshold $T_{new}^k$, which represents the moving average value of the channel quality in time. In example embodiments, P(k) is designed to be an increasing function of $T_{new}^k$, and D(k). A non-limiting example design of P(k) includes:

$$P(k) = \begin{cases} T_{new}^k, & \text{if all } D(k) < D_{th} \\ D(k), & \text{else} \end{cases} \qquad (4)$$

The above-discussed example method will now be described in greater detail with reference to FIGS. 7-9.

Figure 9:
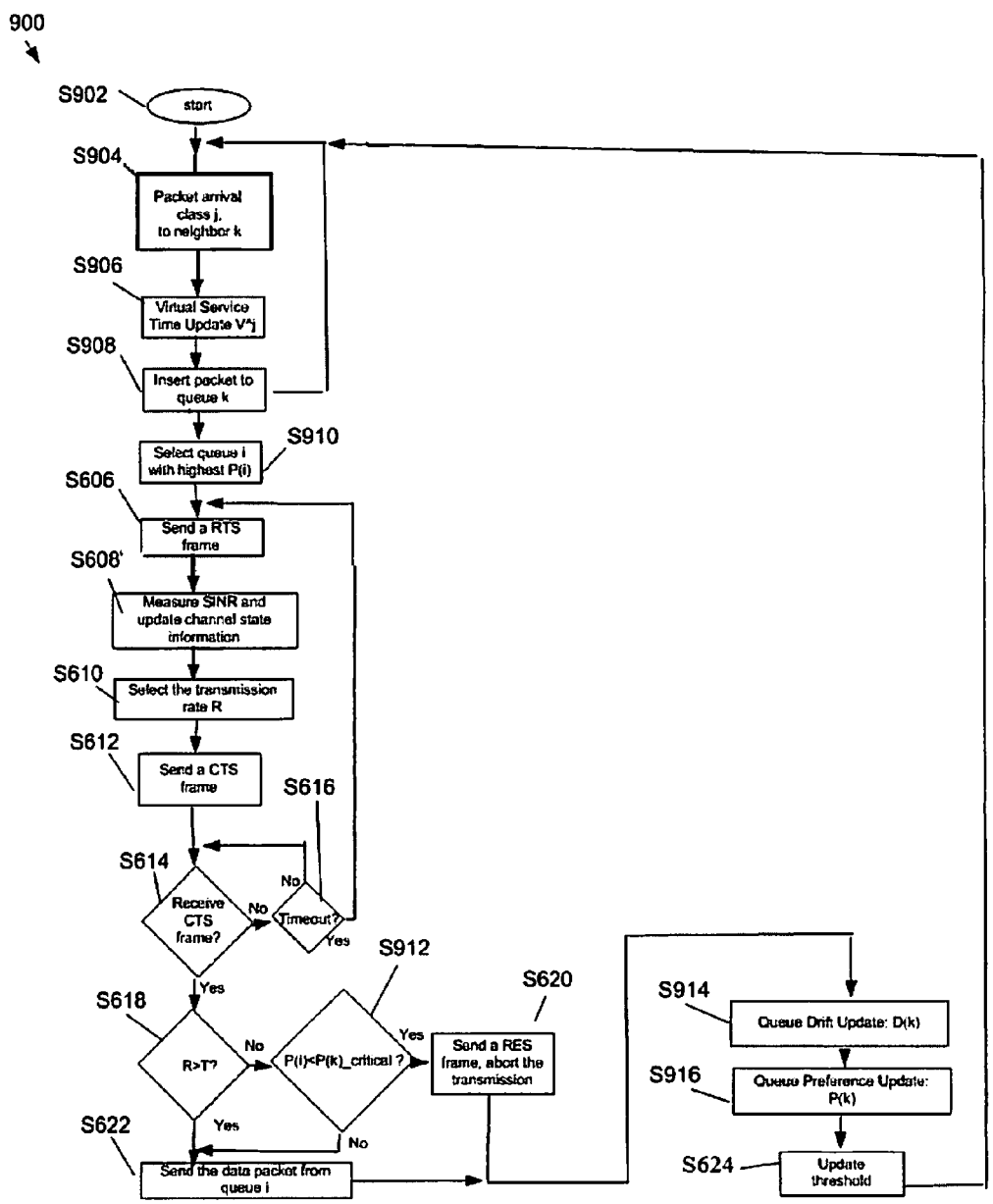
FIG. 9 is a flow chart describing another example communication method between two communication devices in accordance with an aspect of the present invention.

FIG. 9 is a flow chart describing an example communication method 900 between communication device 202 and communication device 208, wherein communication device 202 may additionally desire to communicate with communication devices 210 and 206, in accordance with an aspect of the present invention.

Method 900 starts (S902) and information packets arrive for transmission (S904). In an example embodiment groups of information packets are provided to queue generator 708 and preference updating portion 702.

Next a virtual servicing of the queues is performed (S906). In an example embodiment, preference updating portion 702 monitors a parameter of the information packets arriving at transmitter portion 306. Non-limiting examples of parameters that may be monitored include a number of packets per queue and a time frame between a release of a packet from a queue by queue selector 706. For example, for purposes of discussion, presume that information queue 804 includes a larger number of information packets than information queue 802 and information queue. In such a case, preference updating portion 702 may increase a weighted preference for information queue 802 to increase the likelihood that the next information packet to be released by queue selector will be from information queue 802. Similarly, for purposes of discussion, presume that information queue 806 has not had an information packet released for an amount of time that is longer than that as experienced by both information queue 802 and information queue 804. In such a case, preference updating portion 702 may increase a weighted preference for information queue 806 to increase the likelihood that the next information packet to be released by queue selector 706 will be from information queue 806.

Now that the packets have arrived, they are placed in queues (S908). In an example embodiment, queue generator 708 arranges the information packets into queues based on some predetermined parameter, non-limiting examples of which include the type of data and the destination. This is discussed above with reference to FIG. 8. Queue generator then stores the queues in queue database 710 by way of communication line 718.

At this point a queue is selected (S910). In an example embodiment, preference module 704 includes weighting factors for each of the queues 708. These weighting factors may be based on predetermined parameters, non-limiting examples of which include the type of data, the number of packets to be transmitted, destination, the time since last transmission, etc. For example, returning to FIG. 8, for purposes of discussion, presume that set 812 within information queue 804 has four information packets for transmission, whereas set 810 within information queue 802 has three information packets for transmission and whereas set 814 within information queue 806 has two information packets for transmission. For purposes of discussion, suppose a weighting factor is based solely in the number of packets within an information queue. In this situation, information queue 804 would have the largest weighting factor and information queue 806 would have the smallest weighting factor.

Whatever the bases for determining the weighting factor, once the weighting factors are determined, preference module 704 instructs queue selector 706, by way of communication line 716, to select a specific information queue based on the preference weighting factors. Based on the instruction from preference module 704, queue selector 706 selects a queue, by way of communication line 702, from queue database 710. At this point, queue database 710 readies the next information packet within the selected information queue for transmission.

Once a packet is selected for transmission, an RTS/CTS handshake is performed in accordance with method 600 discussed above with reference to FIG. 6 (S606-S618). A difference between this example method and example method 600 manifests if there is a determination that the prescribed transmission rate is lower than the predetermined threshold (S618).

If there is a determination that the prescribed transmission rate is lower than the predetermined threshold, then it is determined whether it is critical for the information packet to be transmitted (S912). In an example embodiment, this may be accomplished determining whether the queue preference P(k) is greater than a predetermined critical preference P(k)$_{critical}$, i.e., P(k)>P(k)$_{critical}$.

If it is determined that it is not critical for the information packet to be transmitted, then an RES frame is transmitted (S620). For example, similar to method 600 as discussed above with reference to FIG. 6, in an example embodiment, if comparator 420 determines that the prescribed transmission rate is less than the predetermined threshold, comparator 420 instructs RES generator 406, by way of communication line 444, to generate an RES packet. RES generator 406 then provides an RES packet, by way of communication line 428, to transmitter portion 306. At this point, transmitter portion 306 transmits the RES packet, thus letting remaining communication devices 204, 206, 208, 210 and 212, know that communication device 202 will not be using channel 114. As such, remaining communication devices 204, 206, 208, 210 and 212 will know that the media is free for use.

If it is determined that it is critical for the information packet to be transmitted, then the data packet is transmitted (S620). For example, suppose comparator 420 determines that the prescribed transmission rate is less than the predetermined threshold. Comparator 420 may RES generator 406, by way of communication line 444, to generate an RES packet. RES generator 406 then provides an RES packet, by way of communication line 428, to transmitter portion 306. In an example method in accordance with this aspect of the present invention, at this point, preference module 704 would provide an override instruction to output device 712. The override instruction would instruct output device 712 to output the ready information packet from queue database 710 as opposed to the RES packet. Output device 712 would then transmit the information packet.

After either the RES packet is transmitted or the information packet is transmitted, the drift of the queues are updated (S914). In an example embodiment, preference updating portion 702 updates the queue drifts within preference module 704. For example, returning to FIG. 8, presuming that a transmitted information packet came from information queue 804. In this example situation, the queue drift D(802) for information queue 802 and the queue drift D(806) for information queue 806 may be increased, thus increasing the likelihood that the next transmitted packet will originate from one of those two information queues.

Then the queue preferences are updated (S916). In an example embodiment, preference updating portion 702 updates the queue preferences P(k) within preference module 704. For example, returning to equation (4), the queue preference P(802) for information queue 802, the queue preference P(804) for information queue 804 and the queue preference P(806) for information queue 806 may be updated. Continuing with the example that a transmitted information packet came from information queue 804, the queue preference P(802) for information queue 802 may be increased, the queue preference P(804) for information queue 804 may be decreased and the queue preference P(806) for information queue 806 may be increased. Accordingly, thus increasing the likelihood that the next transmitted packet will originate from one of information queue 802 or information queue 806 and decreasing the likelihood that the next transmitted packet will originate from information queue 804.

Then the predetermined threshold is updated, if needed (S624). For example, in situations where the predetermined threshold is static and is common for all communication devices within MANET 200, the predetermined threshold is not changed. However, in situations where each communication device within MANET 200 maintains its own predetermined threshold, based on communication channels with the other communication devices, updating portion 418 updates the predetermined threshold within threshold database 416 by way of communication line 448.

With the example method discussed above with reference to FIG. 9, the information queue with highest transmission rate is selected if all the queue drifts are less than a threshold. Otherwise, the information queue with the highest drift is selected if one or more information queues are drifted more than the threshold. The threshold can be used to control the network efficiency and QoS tradeoff. A higher value of the drift threshold favors efficiency, while a lower value of the drift threshold favors delay in QoS.

Aspects of the present invention deal with distributed medium access control for an MANET. Aspects are drawn to an adaptive threshold-based medium contention scheme to exploit diversity gain in multiple dimensions, in particular, time and user diversity. In example embodiments, each communication device performs a carrier sensing multiple access with collusion avoidance medium access control protocol and accesses the channel only when the channel quality is above a threshold. To address node mobility and time varying fading channels, an aspect of the present invention includes channel estimation and prediction, transmission rate selection and threshold adaption.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed:

1. A communication device operable to communicate with a receiving device over a channel within a mobile ad-hoc network, the receiving device including a CTS packet generating portion operable to generate and a CTS packet based on a parameter of the channel and to transmit the CTS packet over the channel, said communication device comprising:

a transmitter portion operable to transmit information into the channel;

a receiver portion operable to receive information from the channel; and a management portion including an RTS packet generating portion, a CTS packet receiving portion, a threshold database, a comparator and an RES packet generating portion, wherein said management portion is in communication with said transmitter portion and said receiver portion, wherein said RTS packet generating portion is operable to generate a RTS packet and to provide the RTS packet to said transmitter portion, wherein said transmitter portion is operable to transmit the RTS packet to the receiving device by way of the channel, wherein said receiver portion is operable to receive the CTS packet from the receiving device by way of the channel and to provide the CTS packet to said CTS packet receiving portion, wherein said threshold database is operable to store a threshold value for the parameter of the channel and to provide the threshold value to said comparator, wherein said CTS packet receiving portion is operable to provide channel parameter information, to said comparator, based on the CTS packet, wherein said comparator is operable to compare the threshold value and the channel parameter information and to generate an instruction signal based on the comparison, wherein said transmitter portion is operable to transmit information based on the instruction signal, wherein said management portion further includes an updating portion in communication with said threshold database and being operable to update the threshold value within said threshold database based on the CTS packet, and wherein said updating portion is operable to update the threshold value as an updated transmission rate, when receiving a rate indication from the receiving device, as $$T_{new} = \rho \cdot (\alpha R + (1-\alpha) T_{old}), \alpha, \rho \in [0,1],$$

where $T_{new}$ is an updated threshold value provided by the receiving device; $T_{old}$ is the previous threshold value; R is the transmission rate indication from the receiving device; $\alpha$ is a constant of the moving average of the threshold value; $\rho$ is a loading coefficient, which is based on a utilization estimation of the channel.

2. The communication device of claim 1, wherein said threshold database is operable to store the threshold value as a predetermined value.

3. The communication device of claim 1, wherein said transmitter portion is operable to transmit information into the channel that includes a first type of information and a second type of information, wherein said transmitter portion comprises a queue generator, a queue selector, a queue database, a preference module and a preference updating portion, wherein said queue generator is operable to arrange the first type of information into a first queue and to arrange the second type of information into a second queue, wherein said queue database is operable to store the first queue and the second queue, wherein said queue selector is operable to select information from one of the first queue and the second queue to be transmitted into the channel, wherein said preference module is operable to assign a first weighting to the first queue and a second weighting factor to the second queue, and wherein said preference updating portion is operable to change the first weighting factor or the second weighting factor.

4. The communication device of claim 3, wherein said preference updating portion is operable to change the first weighting factor based on a packet length of a packet within the first information.

5. The communication device of claim 4, wherein said preference updating portion is operable to change the first weighting factor as $$P(k) = \begin{cases} T_{new}^k, & \text{if all } D(k) < D_{th} \\ D(k), & \text{else} \end{cases}$$

where P(k) is the first weighting factor, $T_{new}^k$ is a threshold value provided by the receiving device, D(k) is a queue drift that is based on a transmission opportunity for the first queue to account for missed or gained opportunity to access the channel, and $D_{th}$ is a threshold queue drift.

6. A method of communicating with a receiving device over a channel within a mobile ad-hoc network, the receiving device including a CTS packet generating portion operable to generate and a CTS packet based on a parameter of the channel and to transmit the CTS packet over the channel, said method comprising:
   generating, via an RTS packet generating portion of a management portion, a RTS packet;
   providing, via the RTS packet generating portion of the management portion, to the transmitter portion;
   transmitting, via a transmitter portion, the RTS packet to the receiving device by way of the channel;
   receiving, via a receiver portion, the CTS packet from the receiving device by way of the channel;
   providing the CTS packet to a CTS packet receiving portion of the management portion;
   storing, via a threshold database of the management portion, a threshold value for the parameter of the channel;
   providing, via the threshold database, the threshold value to a comparator of the management portion;
   providing, via the CTS packet receiving portion, channel parameter information to the comparator, based on the CTS packet;
   comparing, via the comparator, the threshold value and the channel parameter information;
   generating, via the comparator, an instruction signal based on the comparison;
   generating, via the RES packet generating portion, an RES packet based on the instruction signal;
   transmitting, via the transmitter portion, information into the channel based on the instruction signal; and
   updating, via an updating portion of the management portion, the threshold value within the threshold database based on the CTS packet,
   wherein said updating the threshold value within the threshold database based on the CTS packet comprising updating the threshold value as an updated transmission rate, when receiving a rate indication from the receiving device, as $$T_{new} = \rho \cdot (\alpha R + (1-\alpha) T_{old}), \alpha, \rho \in [0,1],$$

where $T_{new}$ is an updated threshold value provided by the receiving device; $T_{old}$ is the previous threshold value; R is the transmission rate indication from the receiving device; $\alpha$ is a constant of the moving average of the threshold value; $\rho$ is a loading coefficient, which is based on a utilization estimation of the channel.

7. The method of claim 6, wherein said storing, via a threshold database of the management portion, a threshold value for the parameter of the channel comprises storing the threshold value as a predetermined value.

8. The method of claim 6,
   wherein said transmitting information into the channel comprises transmitting information into the channel that includes a first type of information and a second type of information, and
   wherein said transmitting information into the channel further comprises:
   arranging, via a queue generator of the transmitter portion, the first type of information into a first queue and the second type of information into a second queue;
   storing, via a queue database of the transmitter portion, the first queue and the second queue;
   selecting, via a queue selector of the transmitter portion, information from one of the first queue and the second queue to be transmitted into the channel;
   assigning, via a preference module of the transmitter portion, a first weighting factor to the first queue and a second weighting factor to the second queue; and
   changing, via a preference updating portion of the transmitter portion, the first weighting factor or the second weighting factor.

9. The method of claim 8, wherein said changing the first weighting factor or the second weighting factor comprises changing the first weighting factor based on a packet length of a packet within the first information.

10. The method of claim 9, wherein said changing the first weighting factor comprises changing the first weighting factor as $$P(k) = \begin{cases} T_{new}^k, & \text{if all } D(k) < D_{th} \\ D(k), & \text{else} \end{cases}$$

where P(k) is the first weighting factor, $T_{new}^k$ is a threshold value provided by the receiving device, D(k) is a queue drift that is based on a transmission opportunity for the first queue to account for missed or gained opportunity to access the channel, and $D_{th}$ is a threshold queue drift.

11. A computer system program product for executing instructions in a computer system, the computer system program product comprising a tangible, non-transient computer system-readable storage medium having computer system-readable program code embodied in the medium, the computer system being operable to communicate with a receiving device over a channel within a mobile ad-hoc network, the receiving device including a CTS packet generating portion operable to generate and a CTS packet based on a parameter of the channel and to transmit the CTS packet over the channel, the computer system-readable program code being operable to instruct the computer system to perform a method comprising:
   generating, via an RTS packet generating portion of a management portion, a RTS packet;
   providing, via the RTS packet generating portion of the management portion, to the transmitter portion;
   transmitting, via a transmitter portion, the RTS packet to the receiving device by way of the channel;
   receiving, via a receiver portion, the CTS packet from the receiving device by way of the channel;
   providing the CTS packet to a CTS packet receiving portion of the management portion;
   storing, via a threshold database of the management portion, a threshold value for the parameter of the channel;
   providing, via the threshold database, the threshold value to a comparator of the management portion;
   providing, via the CTS packet receiving portion, channel parameter information to the comparator, based on the CTS packet;
   comparing, via the comparator, the threshold value and the channel parameter information;
   generating, via the comparator, an instruction signal based on the comparison;
   generating, via the RES packet generating portion, an RES packet based on the instruction signal; and
   transmitting, via the transmitter portion, information into the channel based on the instruction signal,
   wherein the computer system-readable program code is further operable to instruct the computer system to perform updating, via an updating portion of the management portion, the threshold value within the threshold database based on the CTS packet, and
   wherein the computer system-readable program code is further operable to instruct the computer system to perform said updating the threshold value within the threshold database based on the CTS packet as updating the threshold value as an updated transmission rate, when receiving a rate indication from the receiving device, as $T_{new} = \rho \cdot (\alpha R + (1-\alpha) T_{old}), \alpha, \rho \in [0,1]$, where $T_{new}$ is an updated threshold value provided by the receiving device; $T_{old}$ is the previous threshold value; R is the transmission rate indication from the receiving device; α is a constant of the moving average of the threshold value; ρ is a loading coefficient, which is based on a utilization estimation of the channel.

12. The computer system program product of method of claim 11, wherein the computer system-readable program code is further operable to instruct the computer system to perform said storing, via a threshold database of the management portion, a threshold value for the parameter of the channel as storing the threshold value as a predetermined value.

13. The computer system program product of claim 11,
wherein the computer system-readable program code is further operable to instruct the computer system to perform said transmitting information into the channel as transmitting information into the channel that includes a first type of information and a second type of information, and
wherein the computer system-readable program code is further operable to instruct the computer system to perform said transmitting information into the channel further as:
arranging, via a queue generator of the transmitter portion, the first type of information into a first queue and the second type of information into a second queue;
storing, via a queue database of the transmitter portion, the first queue and the second queue;
selecting, via a queue selector of the transmitter portion, information from one of the first queue and the second queue to be transmitted into the channel;
assigning, via a preference module of the transmitter portion, a first weighting factor to the first queue and a second weighting factor to the second queue; and
changing, via a preference updating portion of the transmitter portion, the first weighting factor or the second weighting factor.

14. The computer system program product of claim 13, wherein the computer system-readable program code is further operable to instruct the computer system to perform said changing the first weighting factor or the second weighting factor as changing the first weighting factor based on a packet length of a packet within the first information.

15. A communication device operable to communicate with a receiving device over a channel within a mobile ad-hoc network, said communication device comprising:
a transmitter portion operable to transmit information into the channel that includes a first type of information and a second type of information,
wherein said transmitter portion comprises a queue generator, a queue selector, a queue database, a preference module and a preference updating portion,
wherein said queue generator is operable to arrange the first type of information into a first queue and to arrange the second type of information into a second queue,
wherein said queue database is operable to store the first queue and the second queue,
wherein said queue selector is operable to select information from one of the first queue and the second queue to be transmitted into the channel,
wherein said preference module is operable to assign a first weighting to the first queue and a second weighting factor to the second queue, and
wherein said preference updating portion is operable to change the first weighting factor or the second weighting factor, and
wherein said preference updating portion is operable to change the first weighting factor as $$P(k) = \begin{cases} T_{new}^k, & \text{if all } D(k) < D_{th} \\ D(k), & \text{else} \end{cases}$$

where P(k) is the first weighting factor, $T_{new}^k$ is a threshold value provided by the receiving device, D(k) is a queue drift that is based on a transmission opportunity for the first queue to account for missed or gained opportunity to access the channel, and $D_{th}$ is a threshold queue drift.

16. The communication device of claim 15, wherein said preference updating portion is operable to change the first weighting factor based on a packet length of a packet within the first information.

* * * * *